United States Patent

Coffey

[15] 3,664,391
[45] May 23, 1972

[54] TREE CUTTING AND PILING APPARATUS

[72] Inventor: Horace D. Coffey, P.O. Box 211, Quesnel, British Columbia, Canada

[22] Filed: Mar. 16, 1970

[21] Appl. No.: 19,696

[52] U.S. Cl. ........................143/32 N, 144/34 D, 143/43 N
[51] Int. Cl. ................B27b 17/02, B27b 11/12, A01g 23/08
[58] Field of Search.......................143/32, 32 N, 32 D, 43 N; 144/3 D, 34

[56] References Cited

UNITED STATES PATENTS

| | | | |
|---|---|---|---|
| 3,461,928 | 8/1969 | Siiro | 144/3 D |
| 3,565,138 | 2/1971 | Albright | 143/32 N X |
| 3,364,960 | 1/1968 | Collins et al. | 143/32 R |
| 1,335,694 | 3/1920 | Norris | 143/32 R |

Primary Examiner—Donald R. Schran
Attorney—Fetherstonhaugh & Co.

[57] ABSTRACT

Apparatus having a mast the upper end of which is secured to a boom and the lower end of which supports a saw. Gripping devices on the mast grasp and hold a tree as the tree is engaged by the saw. The saw includes a support plate which is entered into the kerf as the cut progresses and, at the completion of the cut, the support plate can be used to form a seat for the butt end of the tree. The gripping devices are independently operable to obtain a grip on a second tree while a first tree is still clamped to the mast. The connection between the boom and mast is such that the mast is rotatable to a horizontal position wherein the tree is suspended below the mast which is movable by the boom both vertically and horizontally to deposit the tree at an adjacent unloading site.

6 Claims, 10 Drawing Figures

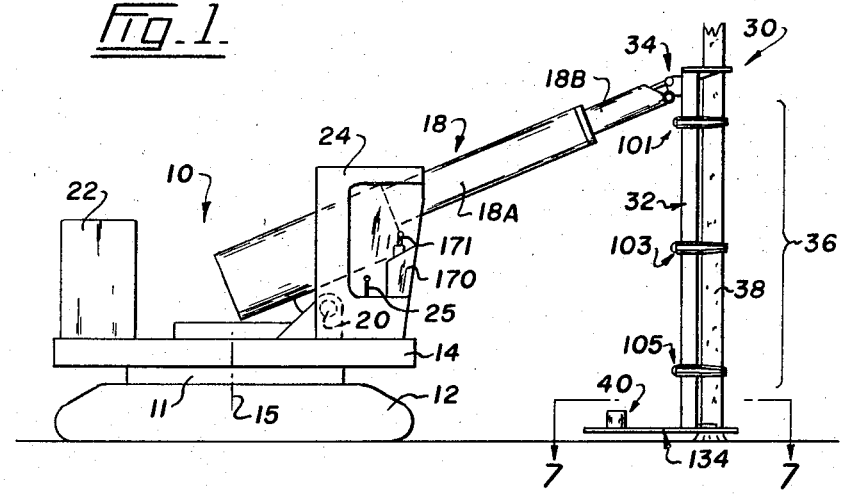
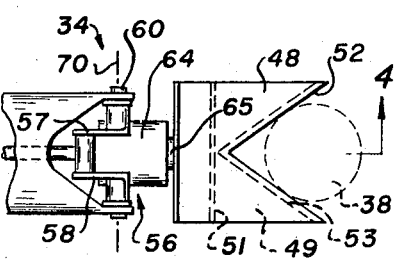
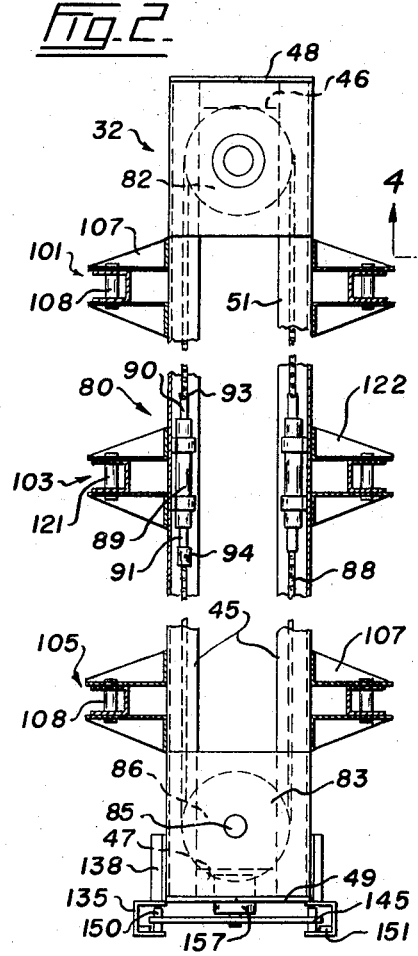
INVENTOR
HORACE D. COFFEY
BY
Featherstonhaugh & Co.
ATTORNEYS

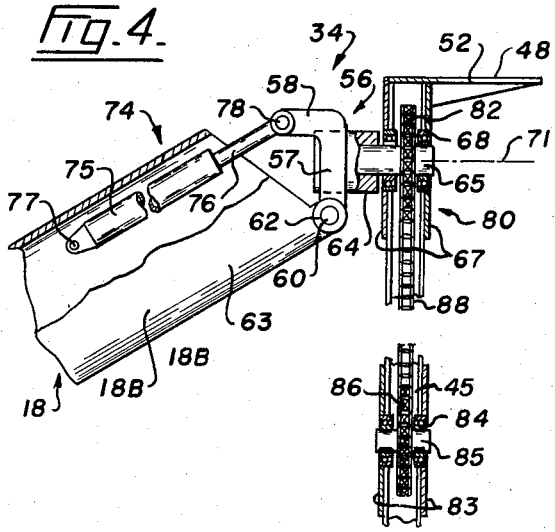
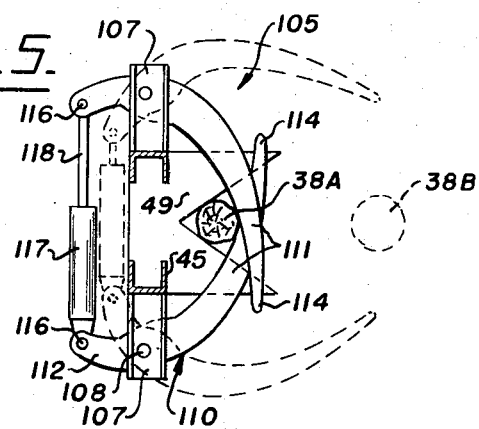
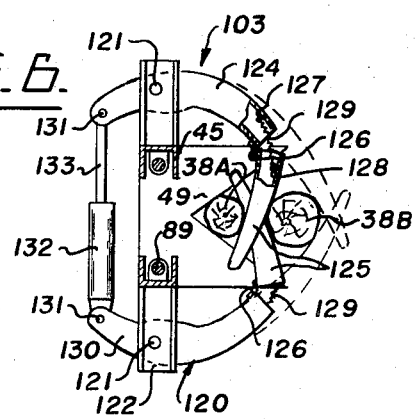
INVENTOR
HORACE D. COFFEY
BY
Fetherstonhaugh & Co.
ATTORNEYS

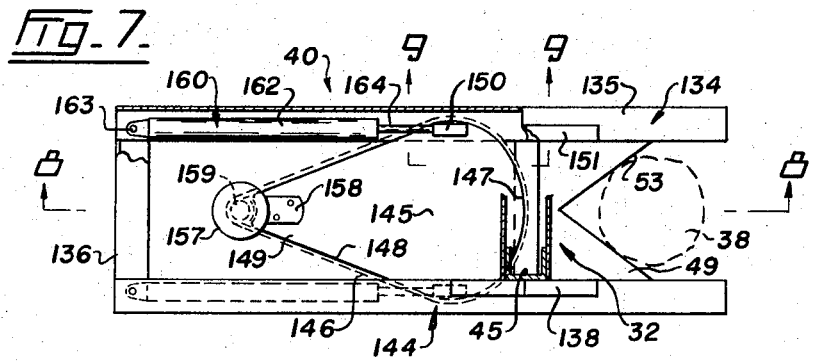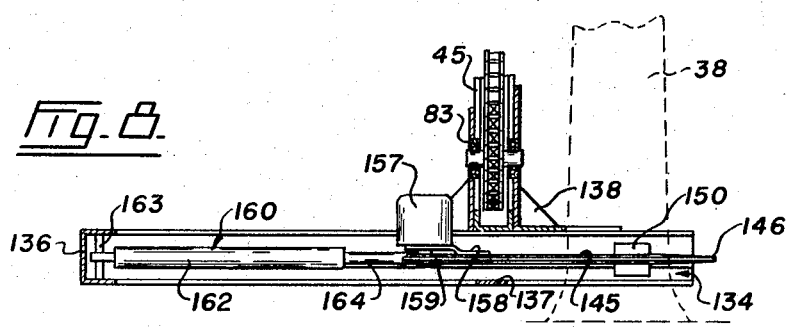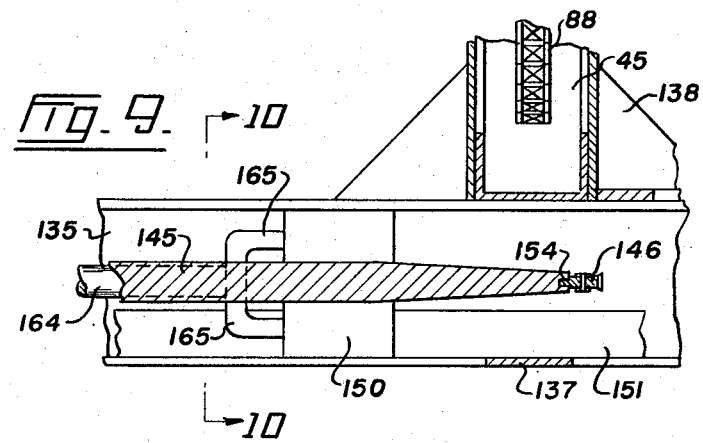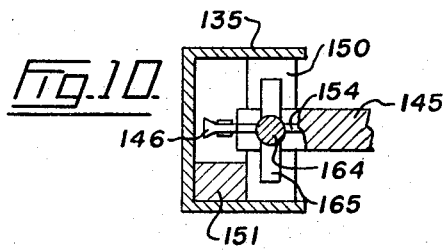

3,664,391

TREE CUTTING AND PILING APPARATUS

My invention relates generally to improvements in apparatus for harvesting trees and more particularly to a device for cutting trees off near the ground and placing them in a pile.

There are a number of machines available for harvesting trees but known machines of this type are limited to use on small trees. Whenever attempts are made to construct larger machines which could handle larger trees, it is generally found that the mechanism is too bulky and cumbersome to function effectively in the woods. The weight of a large tree requires that the tree be gripped reasonably close to the point of balance otherwise the machine must be tremendously strong and heavy in order to support the tree after it is cut but even then it is often found that some machines cannot safely cope with the tendency of a large and overbalanced tree to fall once it is cut with the result that the tree is dropped rather than lowered gently and this can damage the tree and the equipment as well as endanger anyone working in the vicinity. Trees in a stand of timber will, of course, vary in size and conventional machines usually are capable of handling only one tree at a time. This means that the same movements must be executed by the machine for a small tree as for a tree of maximum size and these wasted movements cause a considerable loss of production over any given working period.

My invention overcomes the above as well as other disadvantages of conventional tree harvesters by providing apparatus of a practical size which is capable of cutting and piling either a single large tree or several small trees. The apparatus supports the cut tree at the butt ends as well as at spaced intervals along their trunks whereupon the trees are under control at all times and particularly from the moment a cut has been completed. During the piling operation, the trees are swung to a horizontal position about a point reasonably close to the point of balance of the load so that the tree is kept under control and the power requirements of the apparatus are correspondingly reduced.

In drawings which illustrate a preferred embodiment of the invention,

FIG. 1 is a side elevation of the tree cutting and piling apparatus in accordance with the present invention, the apparatus being shown supported by a typical operating vehicle, FIG. 2 is an enlarged fragmentary front elevation, FIG. 3 is an enlarged plan of the apparatus with the tree grappling and cutting means both purposely omitted, FIG. 4 is a vertical section taken on the line 4—4 of FIG. 3, FIG. 5 is a plan, part in section, showing a grapple clamping one tree to the mast and about to receive a second tree, FIG. 6 is a plan, part in section, showing a modified grapple with the arms thereof mid-way between the fully closed and fully opened position prior to obtaining a grip on a second tree, FIG. 7 is an enlarged horizontal section taken on the line 7—7 of FIG. 1 and showing the saw in retracted position prior to starting a cutting stroke, FIG. 8 is a longitudinal section taken on the line 8—8 of FIG. 7 but showing the saw at the completion of a cutting stroke, FIG. 9 is a further enlarged longitudinal section taken on the line 9—9 of FIG. 7, and FIG. 10 is a transverse section taken on the line 10—10 of FIG. 9.

Referring to FIG. 1, the numeral 10 indicates generally the type of vehicle on which I prefer to mount the present apparatus. This particular vehicle 10 has a frame 11 mounted on crawler tracks 12 and a platform 14 is supported on said frame for swinging movement about a vertical axis indicated at 15. An extensible boom 18, made up of two telescoping sections 18A and 18B, is mounted on the platform 14 for rocking movement about a transverse pivot shaft 20. Platform 14 also supports a motor 22 which supplies power to propel the vehicle 10 and rotate the platform 14. In addition, motor 22 supplies the hydraulic power needed to operate the various mechanisms, not shown, which enables the boom to be extended and retracted as well as rocked about the transverse shaft 20. An operator's cab 24 is mounted on the platform 14 and is provided with controls 25 for maneuvering the vehicle 10 as required through the woods during a tree cutting and piling operation and for moving the extensible boom 18 both horizontally as well as vertically.

The numeral 30 indicates generally the present tree cutting and piling apparatus. As shown in the drawings, apparatus 30 comprises a mast 32 which is secured to the boom 18 by mounting means 34. Mast 32 is provided with grapple means 36 which is used to clamp a tree 38 to the mast during the cutting and piling operation. Sawing of the tree 38 is effected by tree cutting means 40 mounted on the lower end of the mast 32.

Referring now particularly to FIG. 2, the mast generally indicated by the numeral 32 is shown to comprise an elongated frame-like structure having side members 45 which are cross-connected by end members 46 and 47. The end members 46 and 47 are fitted with plates 48 and 49, these plates projecting beyond front face 51 of the mast and being disposed at right angles thereto. In FIG. 3, the upper and lower plates 48 and 49 are shown to have V-notches 52 and 53 in which the tree 38 is seated, when embraced by the grapple means 36, so that said tree cannot move laterally on the mast 32. Preferably, plate 48 is slightly longer than plate 49 to compensate for the taper normally found on the tree trunk and to permit a curved tree to be supported without touching the front face 51 of the mast.

The mounting means generally indicated at 34 is best shown in FIGS. 3 and 4 to comprise a pair of transversely spaced bell cranks 56 which have legs 57 and 58. The legs 57 are provided with trunnions 60 and these trunnions are journalled in transversely spaced bearings 62 formed on outer end 63 of the boom 18. A hub 64 is suitably secured between the bell cranks 56 and supported by this hub is a forwardly extending spindle 65. The upper end of the mast 32 is fitted with a pair of plates 67 on which bearings 68 are mounted and the spindle 65 is journalled in these spaced-apart bearings. Thus, the mast 32 can be rocked about the axis 70 (FIG. 3) of the trunnions 60 and is swingable about the axis 71 (FIG. 4) of the spindle 65 with the aforesaid axes, of course, being disposed at right angles to one another.

Tree cutting and piling apparatus 30 includes power means generally indicated at 74 for rocking the mast 32 about the axis 70. As shown in FIG. 4, the means 74 comprises a double acting hydraulic cylinder 75 having a piston rod 76. The boom 18 has a transverse shaft 77 and the inner end of the cylinder 75 is pivotally secured to this shaft. A pivot pin 78 secures piston rod 76 between the ends of the rearwardly projecting legs 58 of the bell cranks. By pressurizing an appropriate end of the cylinder 75, the mast 32 can be swung about the axis 70 from a rearwardly inclined position where the tree cutting means 40 is alongside the cab 24, to a position inclined forwardly of the upright position shown in FIG. 1.

Referring again to FIGS. 2 and 4, the numeral 80 indicates generally another power means of the apparatus 30 which serves to swing the mast 32 about the axis 71. This particular power means 80 comprises a sprocket 82 which is non-rotatably secured to the spindle 65 between the bearings 68. At the lower end of the mast 32, a pair of plates 83 is secured to the side members 45 and these plates are fitted with bearings 84, see FIG. 4. A shaft 85 is mounted in the bearings 84 and is fitted with an idler sprocket 86. The sprockets 82 and 86 are connected by a chain 88 which, for the most part, is housed within the channel side members 45. Suitably secured within each side member 45, is a hydraulic cylinder 89 having piston rods 90 and 91 which project through opposite ends of this double acting cylinder. The rods 90 and 91 are connected to ends of the chain 88 as at 93 and 94 with suitable means, not shown, being provided to apply appropriate tension to the chain. It will be apparent that, by simultaneously pressurizing opposite ends of the cylinders 89, the mast 32 can be swung in either direction around the spindle 65. The power means just described enables the mast to be rotated about the axis 71 through slightly more than 180°, in either direction, and with the total rotational movement being in excess of 360°.

The grapple means 36 preferably comprises grapples 101, 103 and 105 which are suitably spaced apart on the mast 32 to project beyond the face 51 thereof. Grapples 101 and 105 are identical and their construction can best be seen by the illustration of grapple 105 in FIG. 5. The side members 45 on the mast are fitted with spaced-apart brackets 107 and supported by these brackets to extend therebetween are pivot pins 108, the pins being disposed parallel to the longitudinal axis of said mast. Mounted on the pins 108, is a pair of arms 110 having elongated front portions 111 and relatively short rear portions 112. The front portions 111 converge towards one another and their free ends 114 are spaced apart longitudinally of the mast so as to overlap when the arms 110 are fully closed. The rear portions 112 of the arms also converge towards one another and these rear portions are fitted with pivot pins 116 which connect a hydraulic cylinder 117 and a piston rod 118 therefor, to the arms 110. When the double-acting cylinder 117 is pressurized to fully extend the rod 118, the arms are fully closed, at which time the portions 111 are crossed in front of the mast in a tree clamping position. By pressurizing the cylinder 117 to retract the rod 118, the arms 110 can be fully opened, at which time the free ends 114 are spaced apart a distance substantially equal to the width of the mast 32 or as shown by dotted lines in FIG. 5.

Referring now to FIG. 6, the grapple 103 will be seen to be a slightly modified version of the grapples 101 and 105. Grapple 103 comprises a pair of arms 120 which are mounted on longitudinally extending pivot pins 121, these pins being carried by similarly spaced brackets 122 secured to the side members 45 as before. The arms 120 have shortened front portions 124 which are fitted with overlapping extensions 125. Hinges 126 secure the portions 124 to their extensions 125 so that the arms 120 can be folded back upon themselves. The portions 124 and their extensions 125 are fitted with pins 127 and 128 which serve to anchor the end of tension springs 129. These springs 129 apply sufficient tension to keep the extensions 125 normally aligned with the portions 124 on which they are hingedly mounted. The arms 120 have rear portions 130 which are fitted with pivot pins 131, these pins securing the ends of a hydraulic cylinder 132 and the piston rod 133 therefore, to the relatively short rear portions 130.

The tree cutting means generally indicated at 40, and shown best in FIGS. 7 to 10, comprises a frame 134 which is mounted on the lower ends of the mast 32. Frames 134 has channel side members 135 which are cross-connected at the rear ends by a bar 136 and intermediate their length, by a bar 137. The side members 135 are disposed at right angles to the corresponding members 45 on the mast so as to project both to the front and rear of said mast. Large gusset plates 138 secure the members 135 to the members 45 to firmly attach the frame 134 to the mast 32.

Slidably mounted in the channel side members 135 is a chain saw generally indicated at 144 and comprising a support plate 145 on which a saw chain 146 is mounted. Plate 145 is a pear-shaped member formed of tough steel which may be some one-half inch thick. The support plate 145 has a rounded front end 147 and side edges 148 which taper inwardly to a relatively small rear end 149. On the upper and lower surfaces of the support plate 145, and near the side edges 147 thereof, bars 150 of a suitable hard wearing bearing material are mounted. These wear bars 150 ride in the channel side members 135 so that the saw 144 can freely slide back and forth. Guide rails 151 are mounted in the side members 135 to keep the plate 145 properly aligned as it is reciprocated in the saw frame 134.

The side and front edges of the plate 145 have a peripheral groove 154 in which the saw chain 146 is mounted. A hydraulic motor 157 is mounted on a bracket 158 secured to the plate 145, the motor overhanging the rear end 149 of said plate. Motor 157 has a drive sprocket 159 which engages the chain 146. It will be noticed that the plate 145 is thicker than the saw chain 146. Near the rounded front end 147, the plate 145 is reduced in thickness so as to be tapered on both top and bottom surfaces for about 5 inches, see FIG. 9.

Power means generally indicated at 160 is provided for reciprocating the chain saw 144 through a cutting and return stroke. As shown best in FIG. 7, the means 160 comprises a pair of double acting cylinders 162, there being one such cylinder in each channel member 135. Pins 163 secure the rear ends of the these cylinders 162 to the members 135 near the crossbar 136. Each cylinder 162 has a piston rod 164 which is secured to the plate 145 by a yoke 165.

The several cylinders mentioned above, as well as the motor 157, are all connected to the source of hydraulic power developed by the vehicle motor 22 by the usual hose lines which have been omitted from the drawings for the sake of clarity. These hose lines are suitably attached to the mast 32 where necessary and are strung along the boom 18 to a control console 170 (FIG. 1) mounted in the cab 24. Suitable control valves 171 are provided on the console 170 whereby an operator can manipulate the apparatus 30 through a tree cutting and piling operation.

In operation, the vehicle 10 is adapted to be driven through a stand of timber so as to cut the trees and pile them nearby for removal later by another machine commonly called a skidder. Normally, the skidder is used to drag the cut and piled trees to a collection site called a landing and the present apparatus is moved by the vehicle 10 to cut a swath through the trees usually towards the landing. The swath will be the width of the reach of the boom 18 on both sides of the vehicle 10 and the vehicle moves ahead only when all trees within reach have been cut. The trees are piled with their butt ends even and pointing towards the landing, there being a sufficient number of cut trees in each pile to make a complete load for each run of the skidder. Assuming that a single large tree has to be cut, the mast 32 is placed upright alongside the tree as shown in FIG. 1. The grapples 101, 103 and 105 are closed to clamp the tree to the V-notched plates 48 and 49 whereupon cutting can commence. The motor 157 is started and fluid pressure is fed to the cylinders 162 at a controlled rate to begin the cutting stroke. As the chain saw 146 cuts into the tree, it is followed by the tapered front end 147 of the plate 145 which acts as a wedge to open the kerf and steady the tree. This wedging and steading action of the support plate 145 combines with the forward pressure which is applied to the tree by the extensible boom 18 to prevent the saw chain from binding in the kerf. When the cutting stroke has been completed, the butt end of the tree rests on the support plate 145 which then acts as an additional stop against movement of the tree downwardly on the mast against which it is held by the grapple means 36 although the gripping action of said means normally is quite adequate to hold a single tree.

The operator then manipulates the controls 171 to swing the mast 32 90° about the spindle 65 and 90° about the trunnions 60. These two rotational movements combined places the mast with the cut tree clasped thereto in a horizontal position and with the tree suspended below the mast and supported by the three grapples. As the tree is moved to this position, the boom 18 simultaneously is lowered and is swung to one side so that the tree is positioned below the mast 32 and close to the ground. The grapples 101, 103, and 105 are then opened to drop the cut tree on the ground or on a pile with other similarly cut trees.

Assuming that a number of small trees are to be cut, the grapples 101, 103 and 105 are first opened and then closed to grasp a first small tree 38A (FIGS. 5 and 6) which is then cut off at the base. With tree 38A supported by the grapple 103 and the plate 145, the grapples 101 and 105 are opened to the dotted line position shown in FIG. 5 and the upright mast 32 can then be advanced to allow the second small tree 38B to enter between the open arms 110 so as to abut the tree 38A. The arms 110 of grapples 101 and 105 are now closed to obtain a firm grasp on both trees. As this is done, the second tree presses against the extensions 125 of the grapple 103, which extensions are then folded across the tree 38A. The piston rod end of cylinder 132 is pressurized to open the arms 120. Hinges 126 enable the extensions 125 to fold to the solid line position shown in FIG. 6 whereupon the arms can be withdrawn from between the trees 38A and 38B to the fully opened position. When the arms 120 are again closed, both trees are firmly grasped by all three grapples and the cutting stroke of the chain saw 144 can be completed to sever the second tree.

Not all trees, of course, stand vertically and many grow on sloping ground but the harvesting of such trees presents no special problems to the vehicle-mounted apparatus 30. The mast 32 is quite readily tilted to any angle necessary to be placed alongside the tree whereby the grapple means 36 can obtain a proper grip thereon and the cutting means 40 can be operated in the usual manner.

Trees which have been blown down by the wind or have fallen for other reasons can also be harvested by use of the present apparatus. For this purpose, the boom 32 is rotated about the axes 70 and 71, and is maneuvered by the boom 18, so as to be positioned directly over a windfall and extending parallel thereto. The grapple means 36 is then operated to grip the fallen tree and clasp it to the mast 32 whereupon the cutting means 40 can be operated to cut through the tree, desirably as close to the roots as possible. The cut tree can then be placed in a pile as before to be hauled to the landing by the skidder.

From the foregoing, it will be apparent the present apparatus can be operated by one man to cut and pile trees of varying size. Another man driving the skidder can drag the piles of trees to a landing and there is no need for any additional men to be employed in the vicinity. Since the trees are sawn rather than sheared off near the ground, and are under complete control at all times, the cut trees suffer very little damage or, in other words, are not crushed and split as is usually the case when they are fallen by hydraulically operated shears. The apparatus piles the trees in a manner best suited for the skidder and the two machines working together achieve a very high rate of production.

Apparatus 30 may be constructed to cut and pile trees of up to say, 18 inches in diameter at the butt in which case the mast 32 purposely is made 12 feet long. This particular size of mast has been calculated to place the mounting means 34 reasonably close to the center of balance of the largest trees which can then be cut and piled while under complete control. Since there is less danger of an overbalanced tree being dropped, there is a corresponding reduction in tree damage and the equipment is not subjected to undue strain as might otherwise be the case. If the maximum size of trees to be harvested is 24 inches for example, the mast 32 will be made 16 feet long to counterbalance the tree properly as it is rotated and lowered to the ground during the piling operation.

I claim:

1. Apparatus for cutting and piling trees comprising a vertically and horizontally movable boom, a mast supported by the boom and adapted to be positioned extending longitudinally of a tree, power operated grapple means on the mast for clamping the tree to said mast, tree cutting means near the lower end of the mast and including an endwise movable support plate disposed at right angles to the longitudinal axis of said mast, first power means for moving the support plate towards and away from the tree, said support plate being enterable beneath the butt end of the tree as a cut progresses eventually to form a stop against downward movement of the cut tree clamped to the mast by the grapple means, said grapple means comprising a plurality of grapples longitudinally spaced apart on the mast and having tree embracing arms projecting outwardly therefrom, one of said grapples having arms including front portions and hinged extensions adapted to fold towards the mast, spring means biasing each hinged extension into a normally aligned position with its front portion, said grapples being independently operable to clamp a second tree to the mast after a first tree is clamped thereto.

2. Apparatus as claimed in claim 1, and including a V-notched plate near each end of the mast, said V-notched plates co-operating with the grapple means to hold a cut tree against movement laterally of the mast.

3. Apparatus as claimed in claim 1, and including mounting means securing an upper end of the mast to an outer end of the boom, said mounting means supporting the mast for rotational movement about two axes of rotation disposed at right angles to one another; and second power means for rotating the mast about each axis of rotation whereby said mast is movable between a substantially vertical, forwardly facing, cutting position and a substantially horizontal, downwardly facing, piling position.

4. Apparatus as claimed in claim 3, in which said second power means comprises a sprocket non-rotatably mounted on a spindle included in the mounting means, an idler sprocket journalled in the mast near the lower end thereof, a drive chain trained over the sprockets, and a fluid cylinder and piston rod therefor mounted in the mast and being operatively connected to the drive chain to move said drive chain in either direction.

5. Apparatus for cutting and piling trees comprising a vertically and horizontally movable boom, a mast supported by the boom and adapted to be positioned extending longitudinally of a tree, power operated grapple means on the mast for clamping the tree to said mast, tree cutting means near the lower end of the mast and including side members carried by said mast and adapted to straddle the tree during a cutting operation, a support plate extending between the side members and being slidably supported thereby, an endless saw chain slidably mounted in a peripheral groove formed in the support plate, means for rotating the saw chain about the support plate, and power means for moving the support plate endwise towards and away from the tree, said support plate being enterable beneath the butt end of the tree as a cut progresses while remaining supported by the side members whereby eventually to form a stop against downward movement of the cut tree clamped to the mast by the grapple means.

6. Apparatus as claimed in claim 5, in which said support plate has a tapered front end which wedges open the kerf cut by the saw chain.

* * * * *